Aug. 15, 1961 J. W. BAXTER ET AL 2,995,894
JET NOZZLE ARRANGEMENT FOR SIDE THRUST CONTROL
Filed Sept. 30, 1957 3 Sheets-Sheet 1

*INVENTORS.*
JOHN W. BAXTER
CONSTANT V. DAVID
BY
*Knox & Knox*

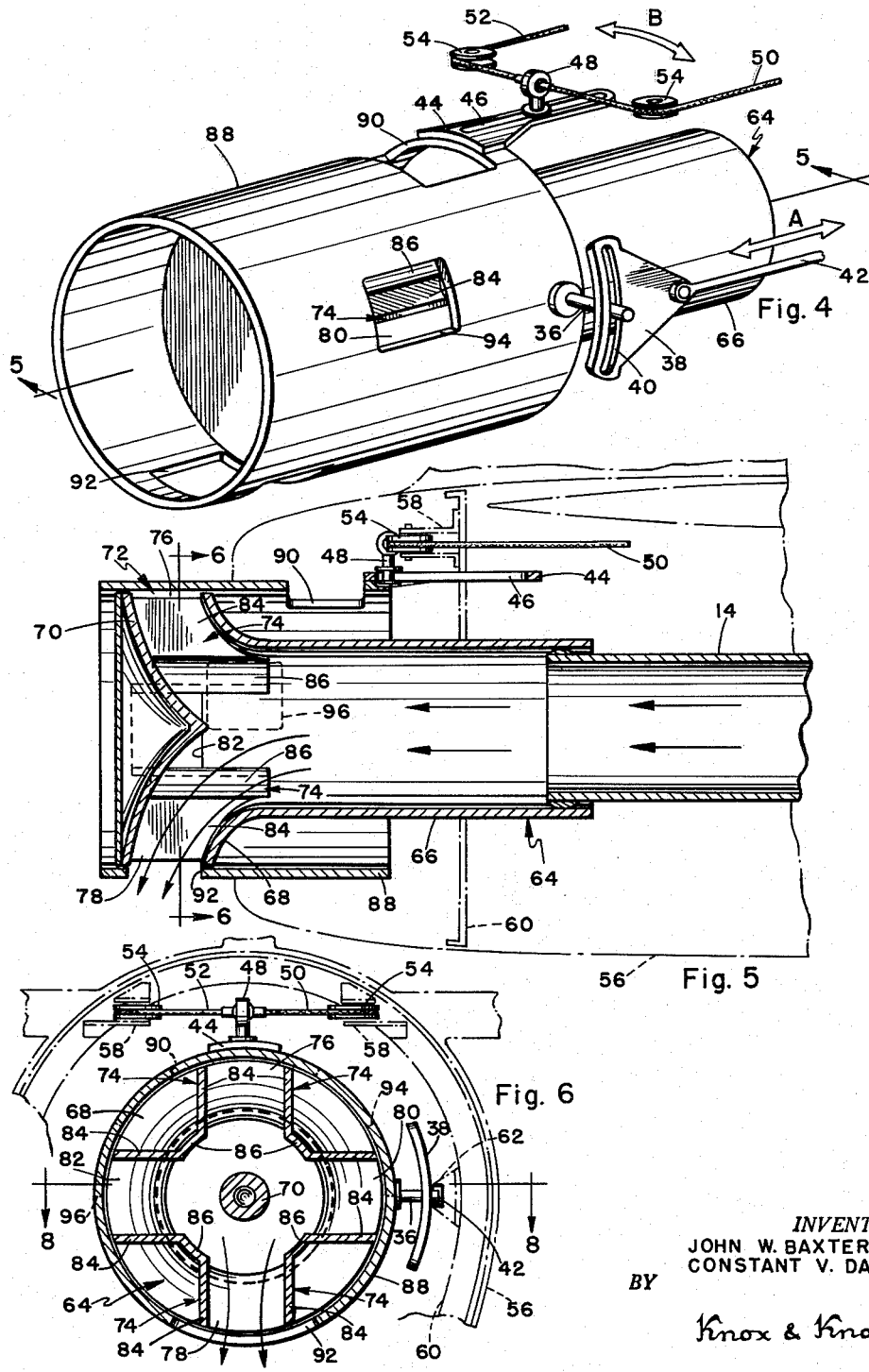

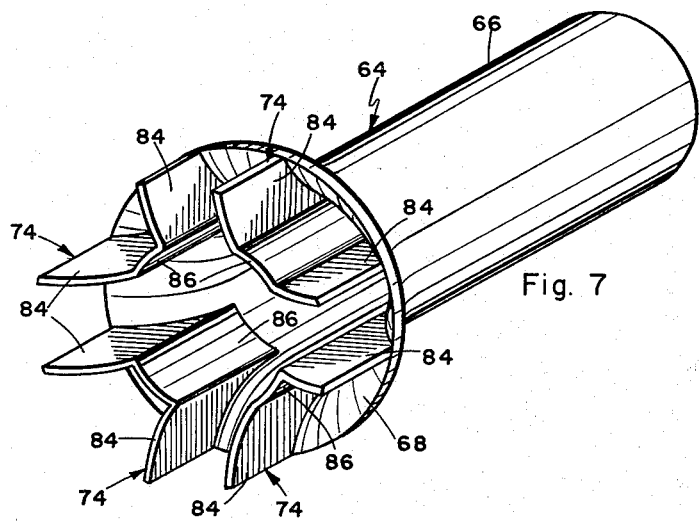
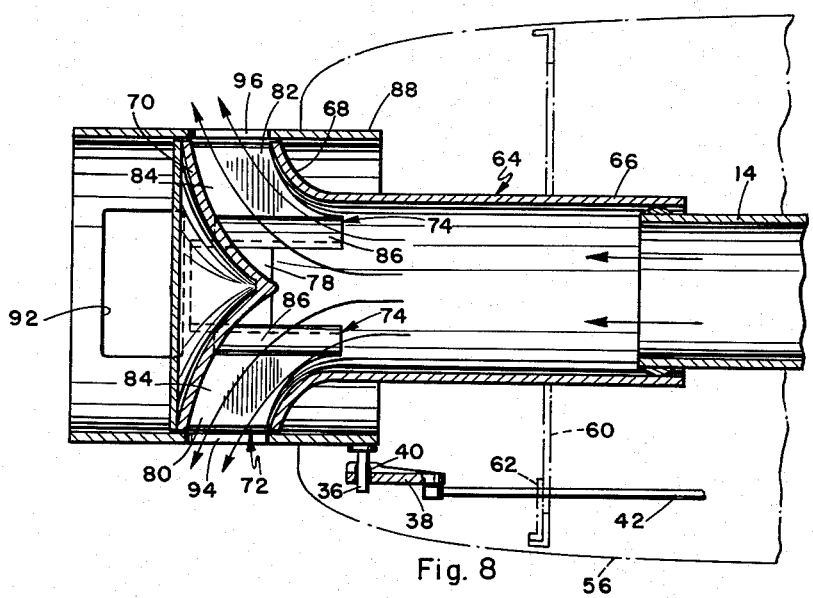

United States Patent Office 2,995,894
Patented Aug. 15, 1961

2,995,894
JET NOZZLE ARRANGEMENT FOR SIDE THRUST CONTROL
John W. Baxter and Constant V. David, San Diego, Calif., assignors to Ryan Aeronautical Company, San Diego, Calif.
Filed Sept. 30, 1957, Ser. No. 687,066
2 Claims. (Cl. 60—35.54)

The present invention relates generally to aircraft control and more particularly to auxiliary jet directional control for aircraft.

The device is specifically designed to provide accurate directional control of an aircraft in hovering flight, such as a vertical-take-off aircraft of the type which rises in a normal horizontal attitude rather than a tail down attitude. Such an aircraft would employ a vertical thrust component for take-off, hovering and landing and a forward thrust component for normal forward flight. In hovering flight there is no airflow over the conventional tail surfaces, thus these surfaces are ineffective for directional control of the aircraft. The herein described device affords directional control of the aircraft by diverting exhaust gases from a suitable gas generator in the appropriate direction to control yaw and pitch. The gas generator may be a separate unit, or a portion of the exhaust of a turbojet may be tapped, or the jet exhaust of a propeller turbine can be utilized. In any case, the device does not divert the main thrust force of the aircraft but is an additional and auxiliary unit which provides a stabilizing and guiding moment while the main thrust component is supporting the aircraft.

The primary object of this invention is to provide a directional control device which utilizes high pressure gases from a gas generator, turbojet, propeller turbine, or the like and diverts the gases in various directions selectively to control yaw and pitching motion of the aircraft.

Another object of this invention is to provide a directional control device in which the gas outlet area may be constant regardless of the direction of thrust, so that operation of the gas generator is unaffected by operation of the device.

Another object of this invention is to provide a directional control device which operates independently of the main thrust producer of the aircraft and which, when in neutral or inoperative position, has no effect on the stability or normal performance of the aircraft.

Another object of this invention is to provide a directional control device which may be used in conjunction with the normal control surfaces of the aircraft, or may substitute in whole or in part for those control surfaces.

Another object of this invention is to provide a directional control device which may be installed in various positions on an aircraft according to the specific control required.

Finally, it is an object to provide a directional control device of the aforementioned character which is simple and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 4 is a perspective view of a modified form of the device in neutral thrust position;

FIGURE 5 is a longitudinal sectional view taken on the line 5—5 of FIGURE 4, with the modified sleeve positioned to provide a downward thrust;

FIGURE 6 is a sectional view taken on the line 6—6 of FIGURE 5;

FIGURE 7 is a perspective view of the plenum chamber portion of the device shown in FIGURES 4–6; and FIGURE 8 is a longitudinal sectional view taken on the line 8—8 of FIGURE 6, with the device in neutral thrust position.

Similar characters of reference indicate similar or identical elements and portions throughout the specification and throughout the views of the drawing.

Figure 1:
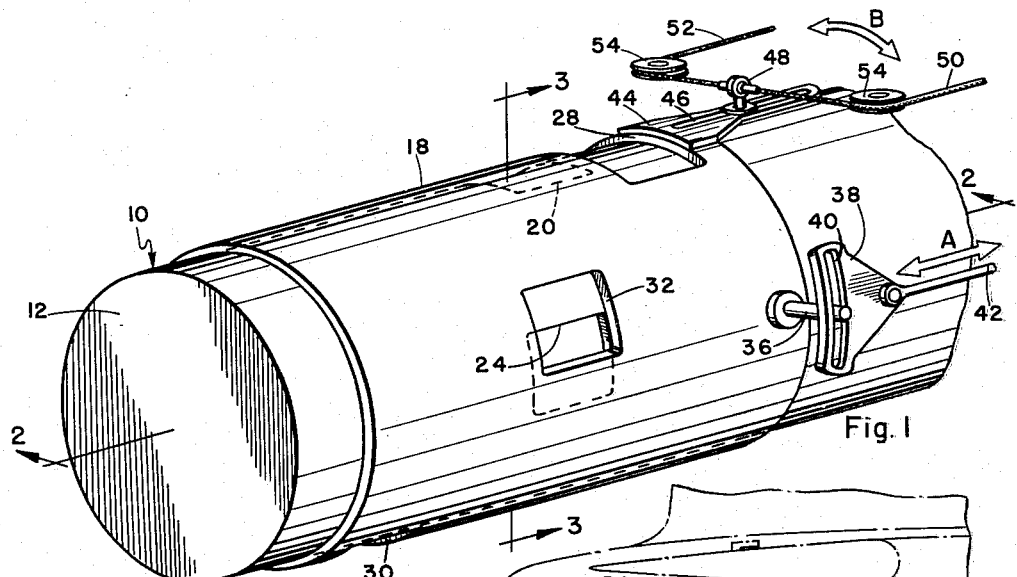
FIGURE 1 is a perspective view of the device in neutral thrust position.
Figure 2:
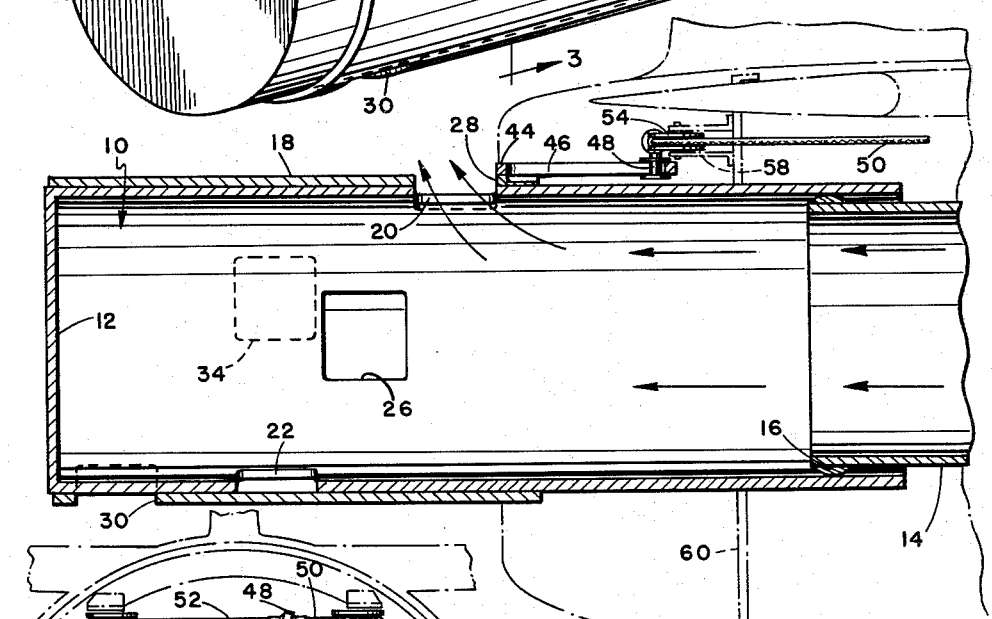
FIGURE 2 is a longitudinal sectional view taken on the line 2—2 of FIGURE 1, but with the sleeve positioned to divert the thrust upwardly.
Figure 3:
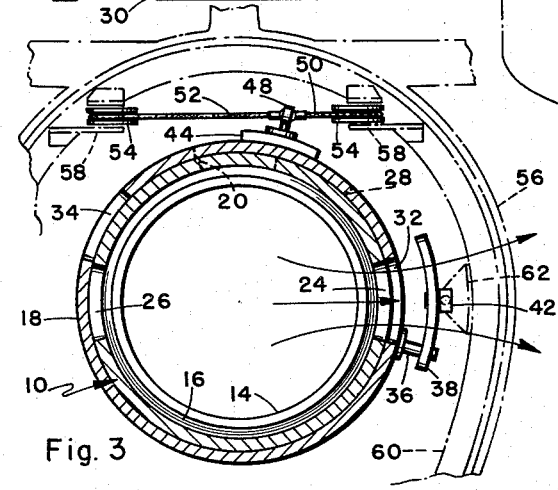
FIGURE 3 is a sectional view taken on the line 3—3 of FIGURE 1, but with the sleeve positioned to provide a side thrust.

Referring now to FIGURES 1–3 of the drawing, the device comprises a cylindrical plenum chamber structure or pipe 10 having a closed rear end 12, the open end thereof being connected to a gas generator 14 by means of a suitable expansion joint 16. The gas generator 14 is indicated fragmentarily by a portion of tail pipe or the like which serves as an exhaust for the gases. Fitted over the plenum chamber pipe 10 is a sleeve 18 which is both rotatable and longitudinally slidable thereon. The pipe 10 has vertical outlets including an upper outlet 20, and a lower outlet 22, and side outlets hereinafter differentiated as the right outlet 24 and the left outlet 26. The right and left outlets 24 and 26 are diametrically opposed in the plenum chamber structure, the upper outlet 20 is disposed upwardly and forwardly of the side outlets and the lower outlet 22 is disposed downwardly and rearwardly thereof. The sleeve 18 is provided with openings corresponding to the outlets in the plenum chamber pipe, said openings including an upper opening 28, a lower opening 30, a right opening 32 and a left opening 34. The right and left openings 32 and 34 are opposed but are located above the longitudinal center line of the sleeve 18 so that, when the sleeve is in no-thrust or neutral position, the outlets 24 and 26 are both half covered, as in FIGURE 1.

The upper opening 28 is disposed so that, when the side outlets 24 and 26 are exposed, said opening is forward of the upper outlet 20 and thus the upper outlet is closed. The lower opening 30 is disposed rearwardly of the lower outlet 22 so that this outlet is also closed when the side outlets are open. Thus, by sliding the sleeve 18 rearwardly, the upper outlet 20 and upper opening 28 are brought into register, while the right and left outlets 24 and 26 are closed. Similarly, by sliding the sleeve 18 forwardly, the lower opening 30 is brought into register with the lower outlet 22 and the side outlets are again closed. The right and left outlets 24 and 26 are individually exposed by rotating the sleeve 18 so that either the right opening 32 or the left opening 34 is brought into complete alignment with the corresponding outlet. It should be noted that the upper opening 28 and lower opening 30 are both elongated circumferentially of the sleeve 18 so that, even when the sleeve is rotated to uncover one of the side outlets, the upper and lower outlets 20 and 22 may still be selectively exposed by sliding the sleeve longitudinally to provide for arbitrary combinations of vertical and lateral thrusts. The various outlets and openings are shown as being generally rectangular, although other shapes may be utilized according to specific requirements.

To shift the sleeve 18 longitudinally, a fixed pin 36 is extended radially from the forward end of the sleeve, said pin engaging in a yoke 38 having an elongated slot 40 extending circumferentially of the sleeve to accommodate rotation thereof. Extending from the yoke 38 is a control rod 42 which is connected to suitable controls adjacent the pilot. Thus, by moving the control rod 42 in the direction of the arrow A in FIGURE 1, the sleeve 18 can be shifted as required in an axial direction. Rotation of the sleeve 18 is achieved by means of a longitudinally extending guide yoke 44 fixed to the forward upper portion of the sleeve, said guide yoke having a slot 46 in which rides a longitudinally slidable pin 48. Connected to the pin 48 are two control cables 50 and 52 which pass around opposed pulleys 54, the control cables being connected to suitable pilot actuated controls. By pulling on the control cables 50 and 52, the sleeve 18 can be rotated in the direction of the arrow B to expose the right and left outlets 24 and 26 selectively.

By way of illustration, the device is shown mounted in the rear fuselage of an aircraft which is indicated in broken line at 56. The pulleys 54 may be secured by suitable brackets 58 to a convenient fuselage frame 60 and the control rod can also be supported by a bracket 62 on said frame.

In neutral thrust position, the right and left outlets 24 and 26 are equally exposed and the lateral thrust forces are in opposition, so that there is no directional reaction. To cause or counteract a yawing motion of the aircraft, the sleeve 18 is rotated, as shown in FIGURE 3, to align the right outlet 24 and right opening 32, at the same time closing the left outlet 26. Thus all the gases are directed through the right outlet 24 causing a lateral or yawing movement of the aircraft. It should be noted that as one side outlet is being opened, the other is being closed in direct proportion, so that the total gas exit area remains constant.

To control pitching motion of the aircraft, the sleeve 18 is moved longitudinally, as in FIGURE 2, uncovering the upper outlet 20 and allowing the gases to escape upwardly as shown by the directional arrows. In sliding the sleeve 18 longitudinally, the right and left outlets 24 and 26 are gradually closed, but the upper outlet 20 is gradually opened, again maintaining a constant gas exit area and preventing back pressure in the plenum chamber 10. Movement of the sleeve 18 in the opposite direction will, of course, uncover the lower outlet 22 to provide an opposite pitching movement. By rotating and sliding the sleeve 18, various combinations of vertical and horizontal thrust may be obtained to provide proportional control in both pitch and yaw simultaneously.

While a specific arrangement of the sleeve 18 and its openings is shown, it should be understood that the arrangement may be altered to suit a particular design of aircraft. The sleeve itself may be made in two parts if necessary for rotation and sliding motion either separately or simultaneously. Similarly, any suitable actuating controls may be used according to accepted aircraft practice.

The device illustrated in FIGURES 4–8 operates on a similar principle to that described above, but has a modified plenum chamber 64 defined by a hollow cylindrical portion 66 having a flared end 68. The other end of the cylindrical portion 66 is connected to a gas generator 14. The plenum chamber 64 is closed at the other end by a suitably shaped deflector cone 70 which is spaced from and concentric with the flared end 68 to define an annular orifice 72, said deflector cone being supported by four baffles 74 which also serve to divide the orifice 72 into four individual portions. The portions include an upper outlet 76, a lower outlet 78, a right outlet 80 and a left outlet 82. Each of the baffles 74 comprises a pair of plates 84 disposed generally at right angles to each other and connected by an arcuate portion 86 corresponding to the internal curvature of the cylindrical portion 66. The forward edge of each plate 84 is curved to fit the flared end 68 while the rear edge is shaped to fit the surface of the deflector cone 70. The baffles 74 are equally spaced around the annular orifice 72 so that the plates 84 extend outwardly and the plates of each pair of adjacent baffles are generally parallel and define a substantially rectangular duct or outlet. The arcuate portions 86 block the remaining portions of the orifice 72 so that the gases must exhaust through the outlets.

A sleeve 88 is slidably and rotatably mounted over the plenum chamber 64 and bears on the rims of the deflector cone 70 and flared end 68. This sleeve 88 has four openings corresponding to the outlets in the plenum chamber 64, said openings including an upper opening 90, a lower opening 92, a right opening 94 and a left opening 96. The openings are arranged similarly to those in the sleeve 18 described above, that is, the right and left openings 94 and 96 are horizontally opposed and above the longitudinal center line, the upper opening 90 being disposed forwardly and the lower opening 92 is rearwardly thereof.

The actuating mechanism shown for operating the sleeve 88 is identical to that described for the sleeve 18 and need not be enumerated further.

In the neutral position, as shown in FIGURES 5 and 8, the gases exhaust through both the right and left outlets 80 and 82 with no effect on the motion of the aircraft. By sliding the sleeve 88 forward, the lower outlet 78 is exposed, as in FIGURES 5 and 6, causing the gas to be diverted downwardly and providing a pitching moment.

The two forms of the device are mechanically similar in operation, although the structure shown in FIGURES 4–8 has the advantage of being more compact and the outlets are all in one plane rather than longitudinally staggered, as in the structure of FIGURES 1–3. The device, as disclosed in either form herein or in equivalent form, need not necessarily be installed in the rear fuselage of an aircraft, but may be located in any suitable place, such as in an engine nacelle, on a wing tip, or at any extremity where the reaction of the gases would be effective.

It should be understood that, although the gas exit area is constant in the structures shown, the area may be made variable for certain purposes by altering the proportions and relative positions of the various outlets.

It is understood that minor variation from the form of the invention disclosed herein may be made without departure from the spirit and scope of the invention, and that the specification and drawings are to be considered as merely illustrative rather than limiting.

We claim:

1. A fluid reaction directional control device for aircraft, comprising: a source of compressed gases; plenum chamber structure for mounting at an extremity of an aircraft substantially externally thereof and communicating with said source; said plenum chamber having a pair of substantially opposed vertical outlets including an upper outlet and a lower outlet; and a pair of substantially opposed side outlets; all of said outlets being peripherally disposed in a common plane, normal to the longitudinal axis with peripheral dead space between adjacent outlets; and closure means adjacent said outlets; said closure means being shiftable to cover and uncover said outlets selectively; said closure means being adjustable to a neutral position wherein the individual outlets in one of said pairs are covered to the same degree; said closure means including a sleeve slidably and rotatably mounted over said outlets; said sleeve having an upper opening, a lower opening and a pair of opposed side openings corresponding generally dimensionally with said outlets; said upper and lower openings being offset axially on opposite sides of said side openings; said sleeve being adjustable to a neutral position wherein said side outlets are equally exposed and said upper and lower outlets are closed; said outlets and said openings being relatively so proportioned and positioned that the total gas exit area is substantially constant at all positions of said sleeve.

2. A fluid reaction directional control device for aircraft, comprising: a source of compressed gases; plenum chamber structure for mounting at an extremity of an aircraft substantially externally thereof and communicating with said source; said plenum chamber structure comprising a generally cylindrical portion having a flared end remote from said source; a fixed deflector cone concentric with and spaced from said flared end; a plurality of deflector cone supporting baffles fixed between said deflector cone and said flared end and defining a plurality of generally circumferentially disposed outlets; said outlets including an upper outlet, a lower outlet and a pair of substantially opposed side outlets; a sleeve slidably and rotatably mounted to cover said outlets; said sleeve having an upper opening, a lower opening and a pair of opposed side openings corresponding generally, dimensionally with said outlets; said upper and lower openings being offset axially on opposite sides of said side openings; said sleeve being adjustable to a neutral position wherein said side outlets are equally exposed and said upper and lower outlets are closed; and actuating means operably connected to said sleeve to shift the sleeve whereby corresponding individual openings and outlets are selectively brought into partial or full register, said outlets and said openings being relatively so proportioned and positioned that the total gas exit area is substantially constant at all positions of the sleeve.

References Cited in the file of this patent

UNITED STATES PATENTS

| | | |
|---|---|---|
| 1,237,364 | Miller | Aug. 21, 1917 |
| 2,465,457 | Johnston | Mar. 29, 1949 |
| 2,518,697 | Lee | Aug. 15, 1950 |
| 2,686,567 | Da Silva Costa | Aug. 17, 1954 |
| 2,857,119 | Morguloff | Oct. 21, 1958 |
| 2,921,435 | Landgraf | Jan. 19, 1960 |
| 2,944,395 | Doak | July 12, 1960 |

FOREIGN PATENTS

| | | |
|---|---|---|
| 622,348 | Great Britain | Apr. 29, 1949 |
| 723,160 | Great Britain | Feb. 2, 1955 |
| 732,127 | Great Britain | June 22, 1955 |

OTHER REFERENCES

S.A.E. Journal, January 1956, vol. 64, No. 1, pages 67–68, Tyler et al., "Silencing the Jet Engine Is Now Possible."